United States Patent [19]
Ashfield

[11] 4,116,322
[45] Sep. 26, 1978

[54] CLUTCHES

[75] Inventor: Herbert Edward Ashfield, Huddersfield, England

[73] Assignee: David Brown Tractors Limited, Huddersfield, England

[21] Appl. No.: 758,754

[22] Filed: Jan. 12, 1977

[30] Foreign Application Priority Data

Feb. 14, 1976 [GB] United Kingdom ............... 5887/76

[51] Int. Cl.² ............................................. F16D 21/06
[52] U.S. Cl. .................................. 192/48.8; 192/70.28; 192/70.29; 192/89 B
[58] Field of Search ................. 192/48.8, 70.28, 70.29, 192/70.3, 89 B

[56] References Cited
U.S. PATENT DOCUMENTS

| | | | |
|---|---|---|---|
| 2,899,897 | 8/1959 | Ludwig | 192/48.8 X |
| 3,021,931 | 2/1962 | Holz | 192/70.3 X |
| 3,175,664 | 3/1965 | Ramsel | 192/70.28 |
| 3,212,611 | 10/1965 | Ruoff et al. | 192/48.8 |
| 3,590,968 | 7/1971 | Binder | 192/48.8 X |
| 3,841,455 | 10/1974 | Eastwood | 192/48.8 X |

*Primary Examiner*—Allan D. Herrmann
*Attorney, Agent, or Firm*—Norris & Bateman

[57] ABSTRACT

An engine is combined with a dual clutch assembly comprising independently engageable and disengageable power take-off and drive clutches in tandem. To minimize the overall length of the combination despite the use of twin plates in the drive clutch, that face of the flywheel remote from the engine has a counterbore defined by a recessed driving surface and a surrounding axially-projecting flange, the power take-off clutch being disposed partially within this counterbore. Circumferentially-spaced radially-outwardly-projecting lugs on the pressure plate for the power take-off clutch are slideable axially in radial slots in the flange.

8 Claims, 1 Drawing Figure

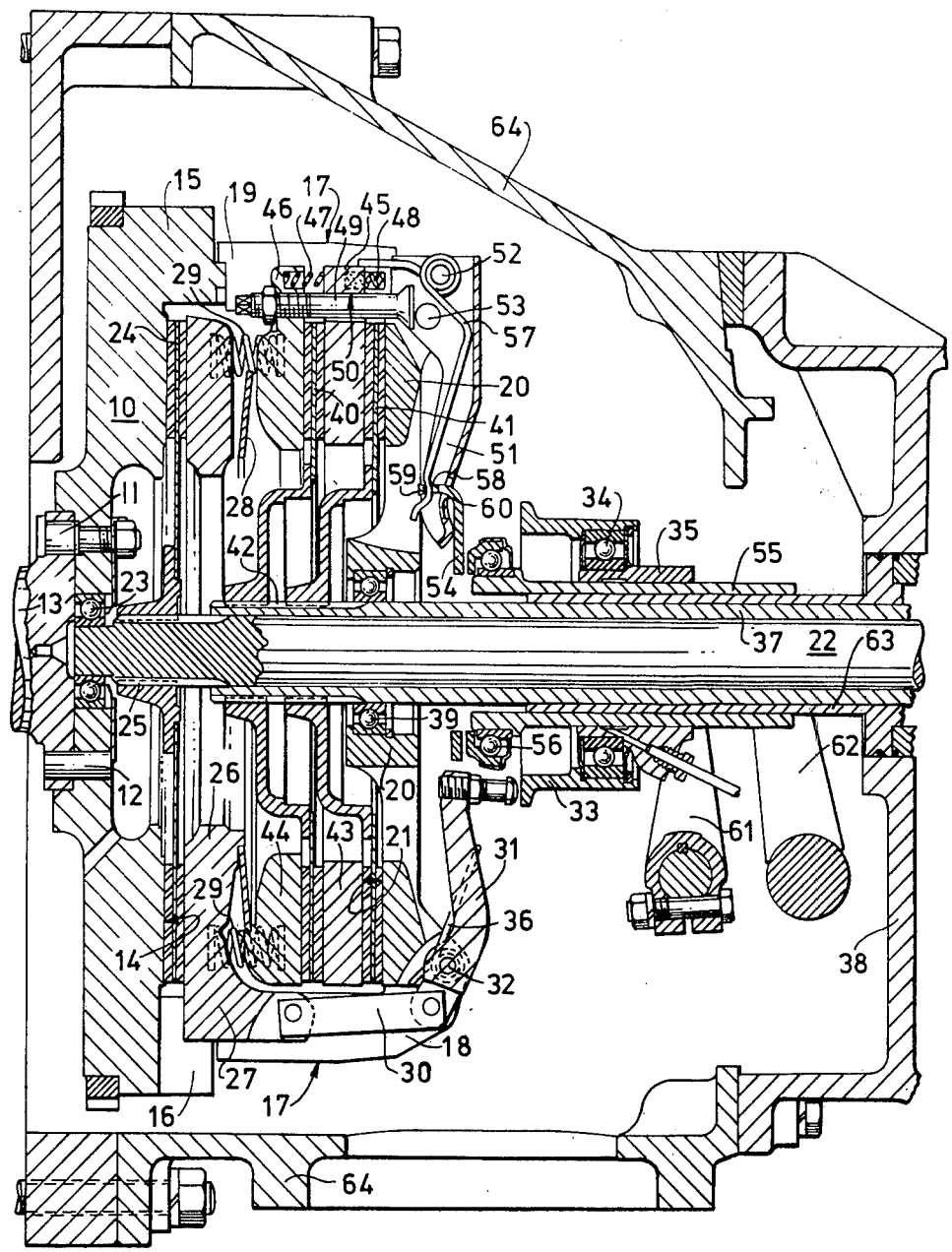

CLUTCHES

BACKGROUND OF INVENTION

The invention relates to engine/dual clutch combinations, particularly but not exclusively for agricultural tractors.

For the purposes of this specification, a dual clutch assembly comprises independently engageable and disengageable power take-off and drive clutches.

The object of the invention is to increase the torque-transmitting capacity of the drive clutch by employing a plurality of clutch plates therein without unduly lengthening the engine flywheel/dual clutch assembly combination.

SUMMARY OF INVENTION

According to the invention, an engine/dual clutch combination includes an engine flywheel having a counterbore defined by a recessed driving surface and a surrounding axially-projecting flange on the face of the flywheel remote from the engine, an annular clutch casing rigidly secured co-axially to the flywheel, a power take-off shaft journalled co-axially in the flywheel, power take-off clutch means disposed partially within the counterbore in the flywheel, an output sleeve co-axially surrounding the power take-off shaft on that side of the power take-off clutch means remote from the flywheel, and multi-plate drive clutch means associated with the output sleeve.

BRIEF DESCRIPTION OF DRAWINGS

A preferred embodiment of the invention will now be described, by way of example, with reference to the accompanying drawing which is a sectional side elevation of an engine flywheel/dual clutch combination for an agricultural tractor.

DESCRIPTION OF PREFERRED EMBODIMENT

Referring now to the drawing, a flywheel 10 is secured by bolts 11 and dowels 2 to one end of an engine crankshaft 13, and has a counterbore defined by a recessed driving surface 14 and a surrounding axially-projecting flange 15 on the face of the flywheel 10 remote from the crankshaft 13. The flange 15 contains three circumferentially-spaced radial slots 16. An annular clutch casing 17 is rigidly secured co-axially to the flywheel 10, and has three circumferentially-spaced radial slots 18 which are aligned in the direction of the axis of the flywheel 10 with the slots 16 in the flange 15 on the flywheel, three radial slots 19 circumferentially-spaced midway between adjacent pairs of the slots 18, and a radially-inwardly projecting flange 20 with a driving surface 21 on its face adjacent the flywheel 10. A power take-off shaft 22 is journalled co-axially in the flywheel 10 by means of a bearing 23. Power take-off clutch means disposed partially within the counterbore in the flywheel 10 comprise a power take-off clutch plate 24 driveably mounted on splines 25 on the power take-off shaft 22 and frictionally engageable between the driving surface 14 and a power take-off clutch pressure plate 26 having radially-outwardly-projecting lugs 27 which are moveable axially in the aligned radial slots 16 and 18, resilient means for urging the pressure plate 26 in the power take-off clutch-engaging direction, said means comprising an annular plate spring 28 co-axially surrounded by twelve circumferentially-spaced helical compression springs 29, and means for moving the pressure plate 26 in a direction away from the flywheel 10 against the action of the resilient means to disengage the power take-off clutch. The means for moving the pressure plate 26 in a direction away from the flywheel 10 comprise three circumferentially-spaced links 30 pivotally connected at one end to the lugs 27 and at the other end to the radially outer ends of respective first-class levers 31 pivoted between their ends at 32 on that end of the clutch casing 17 remote from the flywheel 10, the radially inner ends of the levers 31 being moveable in a direction towards the flywheel 10 by an axially-slideable power take-off clutch operating sleeve assembly. Said assembly comprises an outer sleeve 33 capable of abutting against the levers 31 and rotateably mounted by means of a bearing 34 on an inner sleeve 35 hereinafter referred to. The radially inner ends of the levers 31 are urged in a direction away from the outer sleeve 33 by respective torsion springs 36 coiled around the pivots 32. The outer ends of the torsion springs 36 contact that end of the clutch casing 17 remote from the flywheel 10, and the inner ends of said springs contact those edges of the levers 31 remote from the flywheel 10.

An output sleeve 37 adapted to be driveably connected to the input shaft of the tractor's gearbox (part of the case of which is shown at 38) co-axially surrounds the power take-off shaft 22 on that side of the power take-off clutch means remote from the flywheel 10 and is journalled by means of a bearing 39 in the flange 20 of the clutch casing 17. Multi-plate drive clutch means comprise twin drive clutch plates 40 and 41 driveably mounted on splines 42 on the output sleeve 37, the plate 41 remote from the flywheel 10 being frictionally engageable between the driving surface 21 and a drive clutch auxiliary pressure plate 43 interposed between the clutch plates 40 and 41, and the plate 40 adjacent the flywheel 10 being frictionally engageable between the auxiliary pressure plate 43 and a drive clutch main pressure plate 44, the main pressure plate 44 being urged in the drive clutch-engaging direction by the resilient means which are arranged to urge apart the power take-off clutch pressure plate 26 and the drive clutch main pressure plate 44, and means for moving the main pressure plate 44 in a direction towards the flywheel 10 against the action of the resilient means to disengage the drive clutch. The auxiliary pressure plate 43 and the main pressure plate 44 of the drive clutch have radially-outwardly-projecting lugs 45 and 46 respectively which are moveable axially in the radial slots 19. In order to centralise the drive clutch auxiliary pressure plate 43 when the drive clutch is disengaged, light helical compression springs 47 are disposed one between each of the lugs 45 on said plate and the adjacent one of the lugs 46 on the drive clutch main pressure plate 43, and springs 48 identical to the springs 47 are disposed one between each of the lugs 45 and the clutch casing 17, the springs 47 and 48 being arranged to act in the direction of the axis of the drive clutch. The means for moving the drive clutch main pressure plate 44 in a direction towards the flywheel 10 comprise three circumferentially-spaced rods 49 rigidly secured to the main pressure plate 44 as by the threaded connection shown in the drawing and passing freely through apertures 50 in the drive clutch auxiliary pressure plate 43, and respective second-class levers 51 pivoted at their radially outer ends at 52 on that end of the clutch casing 17 remote from the flywheel 10 and provided between their ends with pins 53 capable of abutting against those ends of the rods 49 remote from the flywheel 10, the radially inner ends of the levers 51 abutting against a plate 54 which is moveable in a direction towards the flywheel 10 by an axially slideable drive clutch operating sleeve 55 on which there is mounted a bearing 56 capable of abutting against the plate 54. The plate 54 is maintained in contact with the levers 51, and said plate and said levers are urged in a direction away from the bearing 56, by three torsion springs 57 coiled around the respective pivots 52. The outer ends of the torsion springs 57 contact the periphery of the drive clutch auxiliary pressure plate 43, and the inner ends of said springs engage in holes 58 in respective fingers 59 which project axially from the plate 54 through apertures 60 in the levers 51.

The inner sleeve 35 of the power take-off clutch operating sleeve assembly co-axially surrounds, and is slideable by a power take-off clutch disengaging fork 61 upon, the drive clutch operating sleeve 55, and the last-mentioned sleeve co-axially surrounds, and is slideable by a drive clutch disengaging fork 62 upon, a tubular support 63 which is fixed to the case 38 of the gearbox and co-axially surrounds the output sleeve 37.

The entire flywheel/dual clutch combination is enclosed in a clutch housing 64 adapted to be rigidly secured between the engine and the case 38 of the gearbox.

In operation, when both clutches are engaged drive is transmitted from the flywheel 10 to the power take-off shaft 22 by way of the pressure plate 26 and the clutch plate 24, and drive is transmitted from the flywheel 10 to the output sleeve 37 by way of the clutch casing 17, the pressure plates 43 and 44, and the clutch plates 40 and 41. The power take-off clutch is disengageable independently of the drive clutch by pivotting the fork 61 in an anticlockwise direction as seen in the drawing to cause the operating sleeve assembly 33, 34, 35 to act through the levers 31 and the links 30 to pull the pressure plate 26 out of frictional engagement with the clutch plate 24 against the action of the resilient means 28, 29. The drive clutch is disengageable independently of the power take-off clutch by pivotting the fork 62 in an anticlockwise direction as seen in the drawing to cause the operating sleeve 55 and bearing 56 to act through the plate 54, the levers 51 and the rods 49 to push the main pressure plate 44 out of frictional engagement with the clutch plate 40 against the action of the resilient means 28, 29, the auxiliary pressure plate 43 being simultaneously moved out of frictional engagement with the clutch plates 40 and 41 by the action of the light centralising springs 47 and 48.

In a modification, the resilient means consist solely of an annular plate spring or solely of a plurality of circumferentially-spaced helical compression springs.

I claim:

1. An engine/dual clutch combination including an engine flywheel having a counterbore defined by a recessed driving surface and a surrounding axially-projecting flange on the face of the flywheel remote from the engine; an annular clutch casing rigidly secured co-axially to the flywheel and having a radially-inwardly projecting flange with a driving surface on its face adjacent the flywheel; a power take-off shaft journalled co-axially in the flywheel; power take-off clutch means disposed partially within the counterbore in the flywheel; an output sleeve co-axially surrounding the power take-off shaft on that side of the power take-off clutch means remote from the flywheel; multi-plate drive clutch means comprising twin drive clutch plates carried driveably by the output sleeve, that one of said twin clutch plates remote from the flywheel being frictionally engageable between the driving surface on the flange on the clutch casing and a drive clutch auxiliary pressure plate interposed between the twin drive clutch plates, and that one of said twin clutch plates adjacent the flywheel being frictionally engageable between said auxiliary pressure plate and a drive clutch main pressure plate, said auxiliary and main clutch pressure plates being axially movable; said main pressure plate and the power take-off clutch means being both urged in thier respective clutch-engaging directions by common resilient means; and means for moving said main pressure plate in a direction towards the flywheel against the action of the resilient means to disengage the drive clutch comprising a plurality of circumferentially-spaced rods rigidly secured to said main pressure plate and passing driveably through apertures in the drive clutch auxiliary pressure plate, and respective second-class levers pivoted at their radially outer ends on that end of the clutch casing remote from the flywheel and capable of abutting between their ends against those ends of said rods remote from the flywheel, the radially inner ends of said levers being moveable in a direction towards the flywheel by an axially-slideable drive clutch operating sleeve.

2. A combination according to claim 1, wherein the resilient means comprise an annular plate spring acting conjointly with a plurality of circumferentially-spaced helical compression springs.

3. A combination according to claim 1, wherein the flange on the flywheel contains a plurality of circumferentially-spaced radial slots, and the power take-off clutch means comprise a power take-off clutch plate carried driveably by the power take-off shaft and frictionally engageable between the recessed driving surface on the flywheel and a power take-off clutch pressure plate having radially-outwardly-projecting lugs which are moveable axially in the radial slots in the flange on the flywheel, said pressure plate being urged in the power take-off clutch-engaging direction by said resilient means, and means connected to said lugs for moving said pressure plate in a direction away from the flywheel against the action of the resilient means to disengage the power take-off clutch.

4. A combination according to claim 3, wherein the means for moving the power take-off clutch pressure plate in a direction away from the flywheel comprise a plurality of circumferentially-spaced links pivotally connected at one end to the lugs on said pressure plate and at the other end to the radially outer ends of respective first-class levers pivoted between their ends on that end of the clutch casing remote from the flywheel, the radially inner ends of said levers being moveable in a direction towards the flywheel by an axially-slideable power take-off clutch operating sleeve.

5. A combination according to claim 1, having means for centralising the drive clutch auxiliary pressure plate between the drive clutch main pressure plate and the driving surface on the flange on the clutch casing.

6. A combination according to claim 5, wherein the means for centralising the auxiliary pressure plate comprises two identical sets of light helical compression springs, one set being disposed between the auxiliary pressure plate and the main pressure plate, and the other set being disposed between the auxiliary pressure plate and the clutch casing.

7. An engine/dual clutch combination including an engine flywheel having a counterbore defined by a recessed driving surface and a surrounding axially-projecting flange on the face of the flywheel remote from the engine; an annular clutch casing rigidly secured co-axially to the flywheel and having a plurality of circumferentially-spaced radial slots and a radially-inwardly projecting flange with a driving surface on its face adjacent the flywheel; a power take-off shaft journalled co-axially in the flywheel; power take-off clutch means disposed partially within the counterbore in the flywheel; an output sleeve co-axially surrounding the power take-off shaft on that side of the power take-off clutch means remote from the flywheel; multi-plate drive clutch means comprising twin drive clutch plates carried driveably by the output sleeve, that one of said twin clutch plates remote from the flywheel being frictionally engageable between the driving surface on the flange on the clutch casing and a drive clutch auxiliary pressure plate interposed between the twin drive clutch plates and having radially-outwardly-projecting lugs which are moveable axially in the radial slots in the clutch casing, and that one of said twin clutch plates adjacent the flywheel being frictionally engageable between said auxiliary pressure plate and a drive clutch main pressure plate also having radially-outwardly-projecting lugs which are moveable axially in the radial slots in the clutch casing; said main pressure plate and the power take-off clutch means being both urged in their respective clutch-engaging directions by common resilient means; and means for moving said main pressure plate in a direction towards the flywheel against the action of the resilient means to disengage the drive clutch comprising a plurality of circumferentially-spaced rods rigidly secured to the lugs on said main pressure plate and passing driveably through apertures in the lugs on the drive clutch auxiliary pressure plate, and respective second-class levers pivoted at their radially outer ends on that end of the clutch casing remote from the flywheel and capable of abutting between their ends against those ends of said rods remote from the flywheel, the radially inner ends of said levers being moveable in a direction towards the flywheel by an axially-slideable drive clutch operating sleeve.

8. A combination according to claim 7, having means for centralising the drive clutch auxiliary pressure plate between the drive clutch main pressure plate and the driving surface on the flange on the clutch casing.

* * * * *